United States Patent Office 3,519,431
Patented July 7, 1970

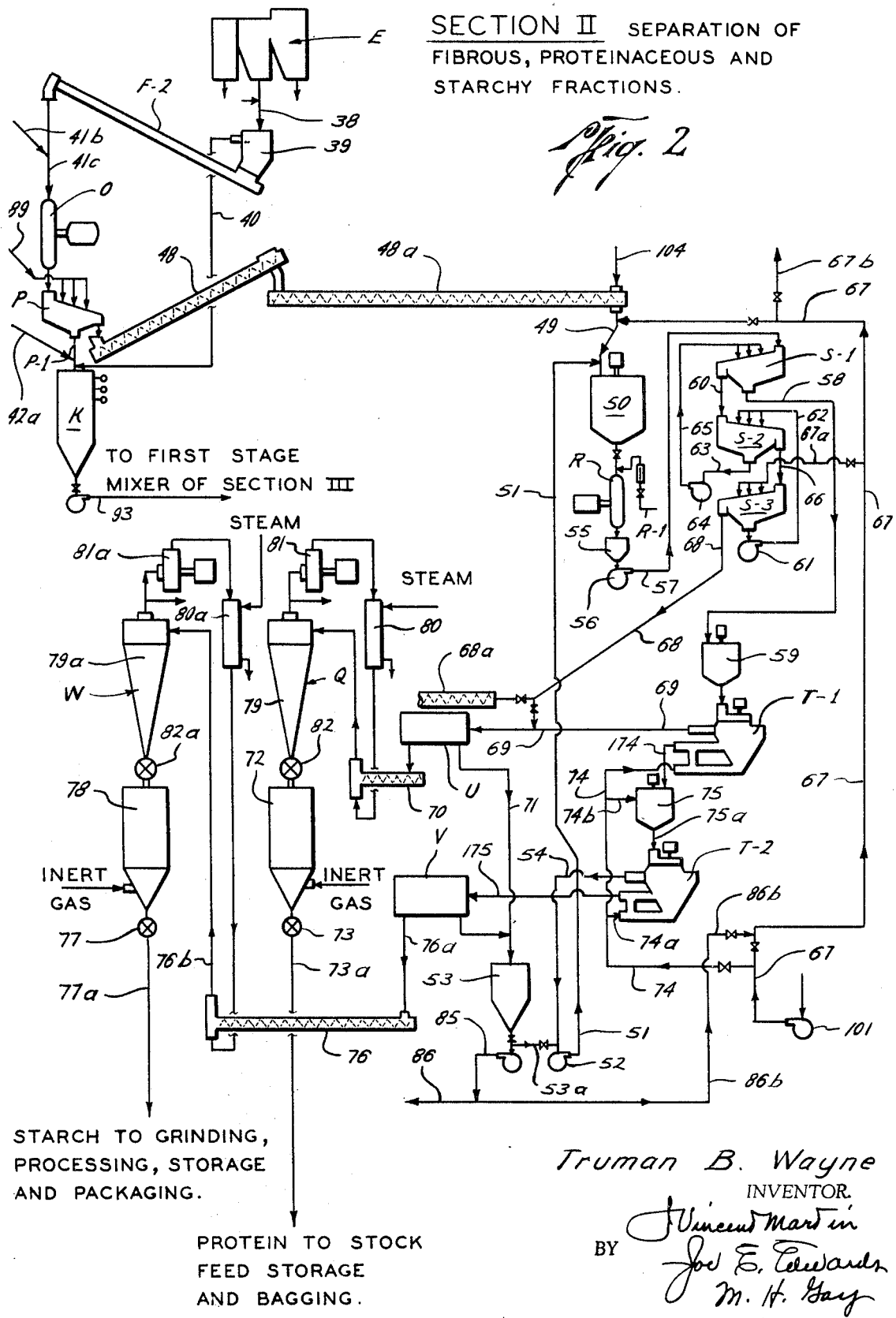

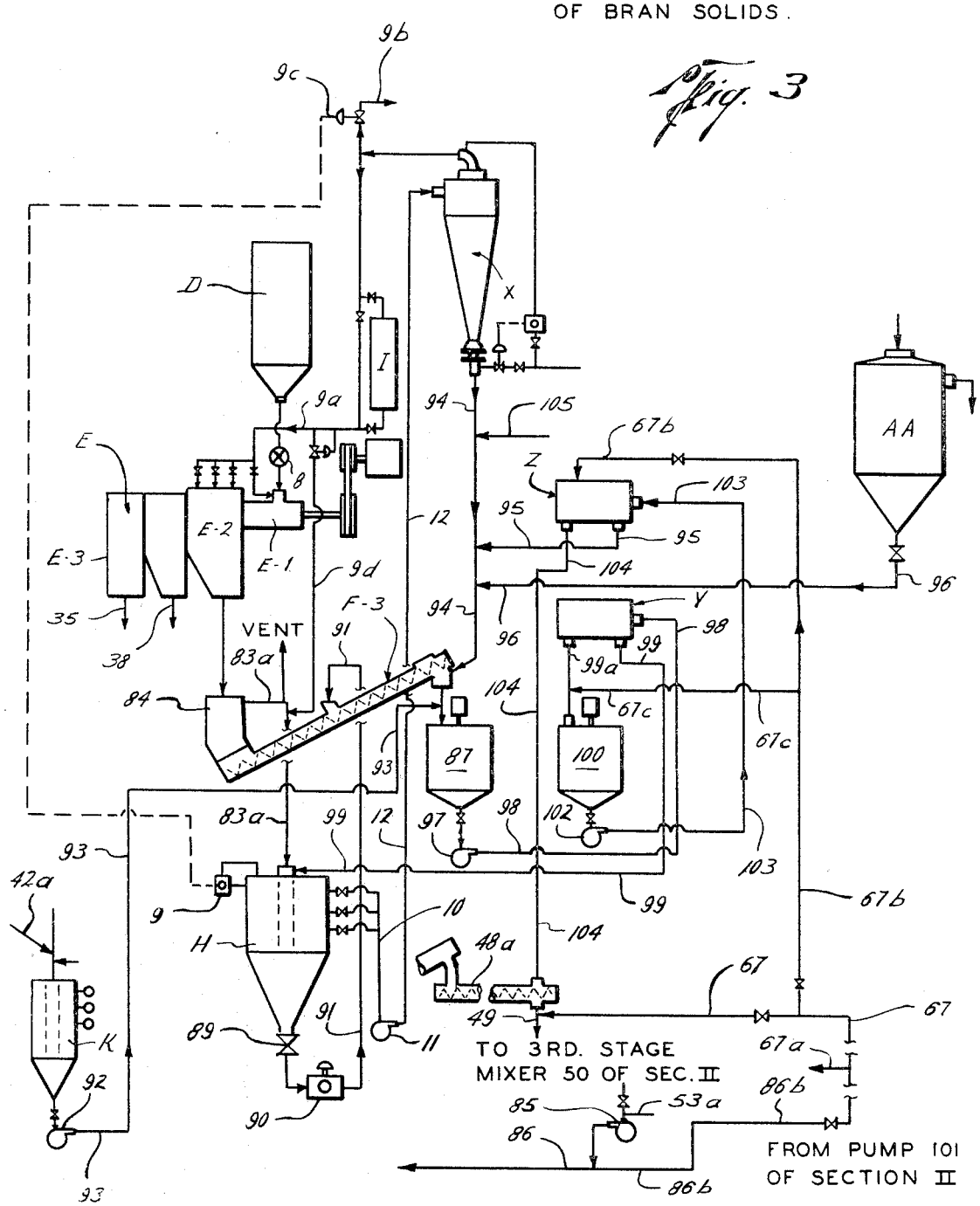

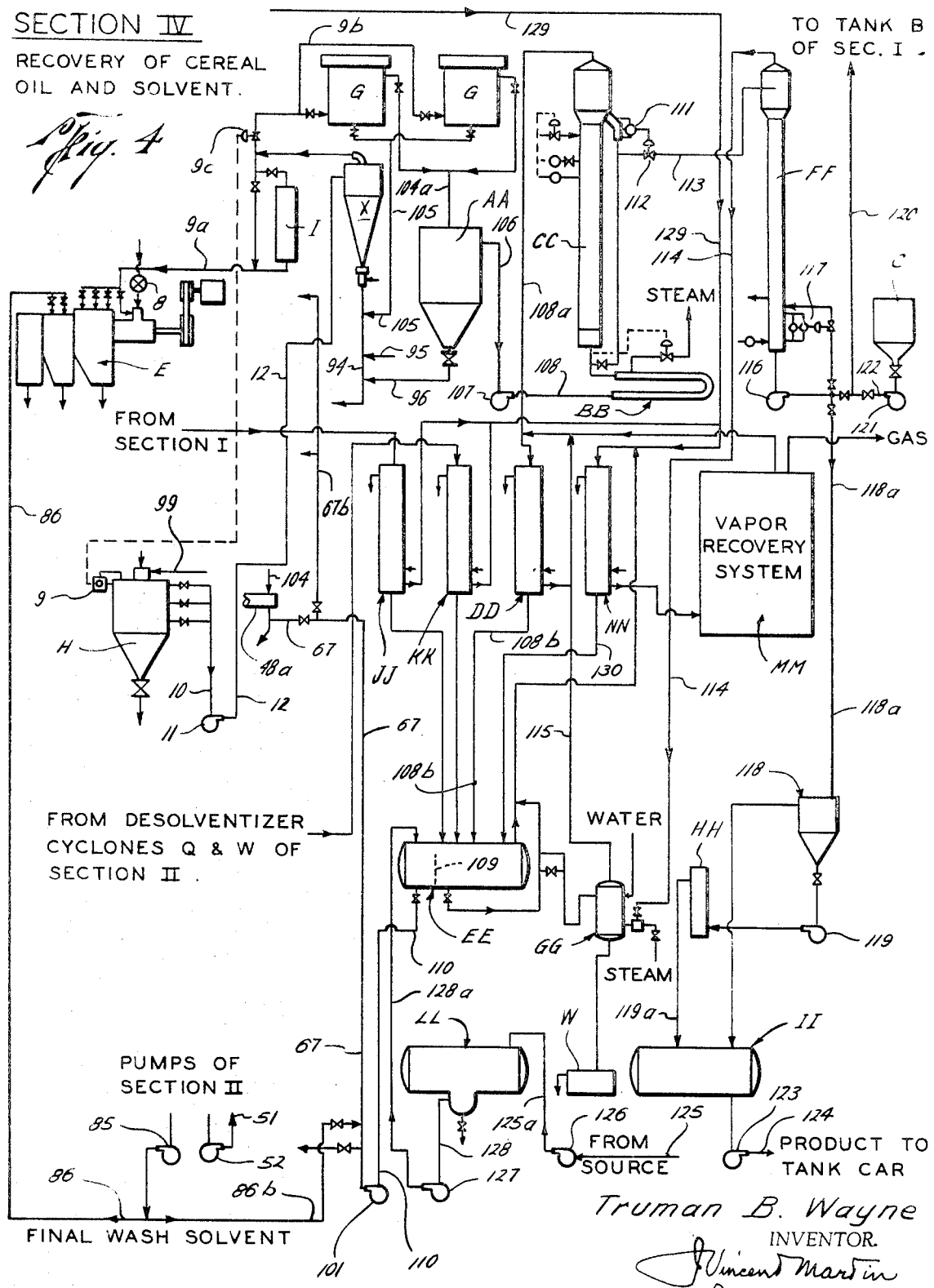

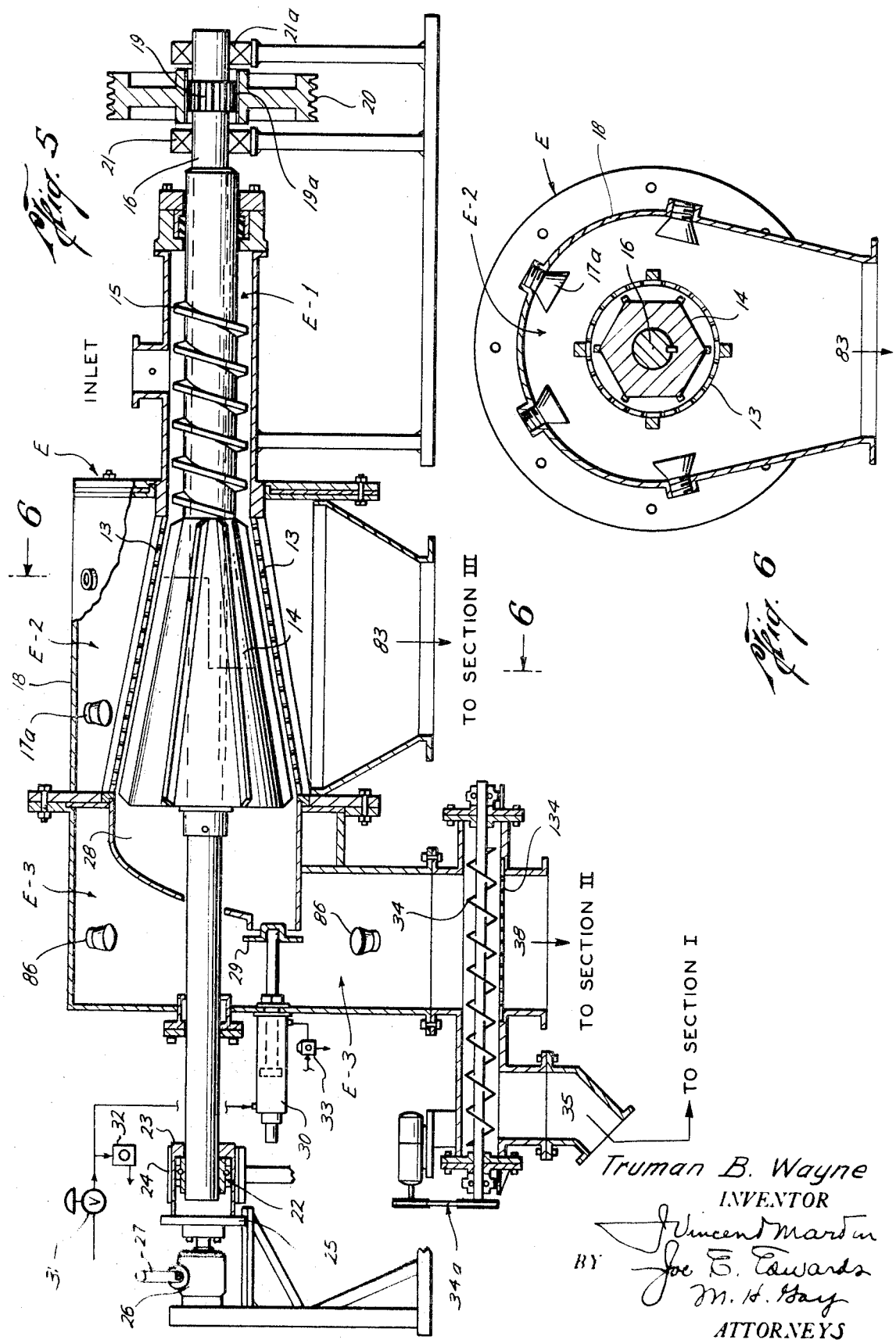

3,519,431
MILLING OF CEREAL GRAINS AND PROCESSING OF PRODUCTS DERIVED THEREFROM
Truman B. Wayne, P.O. Box 13086, Houston, Tex. 77019
Filed June 13, 1966, Ser. No. 557,030
Int. Cl. A23l *1/10*
U.S. Cl. 99—80                                    24 Claims

ABSTRACT OF THE DISCLOSURE

The bran coat of cereal grain is removed in a substantially nonaqueous solvent medium to simultaneously mill the germ fraction and pericarp from the grain while additionally extracting a substantial amount of fatty content. The process also embraces desolventizing and the recovery of unbroken and larger broken milled kernels; the separation and recovery of fibrous, proteinaceous and starchy components of cereal grain and, the recovery of solvent and cereal oil which is contained in the extraction steps.

---

This invention relates to improvements in the milling of the cereal grains from the group comprising wheat, maize or corn, rye and the sorghum grains from which are produced various flour products, starches, high protein feedstuffs and vegetable oils. Further, it relates to improvements in the processing of products derived from the milling of grains.

Conventional milling practices which are applied to the cereal grains generally and also to the sorghum grains fall into three general classes:

(1) Dry milling wherein it is desirable to preserve the kernels in their whole state following the partial or complete removal of the germ fraction and the surface bran layers which will herein be collectively referred to as the pericarp. The milling of rice, the pearling of barley and of parboiled wheat or "bulgur" are examples.

(2) Dry milling such as is applied in the production of cereal flours and meals from grains such as maize or corn, wheat, oats and rye.

(3) Wet milling as is used in starch manufacture from rice, wheat, maize or corn and the sorghum grains.

In the conventional dry milling and wet milling practices wherein a separation is made of the oil-containing germ fraction, advantage is taken of the differences in cohesiveness of the oily germ fraction and/or its differences in specific gravity and floatability in an aqueous medium to effect the separation of this germ fraction from the main starch, fibrous and proteinaceous or gluten fractions. In wheat milling, for example, the wheat kernels are ground between rolls and the finer, more friable starchy endosperm passes through a vibratory or oscillatory screen which may also be provided with air aspiration, whereas the more cohesive germ and fibrous fractions traverse the screening surface and are separately collected. However, in starch production by the wet milling process, the steeped and softened cereal grain is subjected to a disintegrating effect to extricate the germ fractions with as little degradation as possible, after which the disintegrated mass is made into a slurry with water and the separation of germ fractions from the starchy and fibrous fractions is effected by flotation wherein the germ fractions rise to the surface and are floated off and accumulated for further separation from adhering starch, extraction of excess water, drying and finally oil extraction which is usually accomplished in expellers followed by solvent extraction.

Dry milling as heretofore practiced in the preparation of the several cereal grain flours and meals involves no aqueous separations although water may be used prior to milling to temper the grain for the milling process. The mechanical separation of the more cohesive, less friable germ fraction proceeds quite efficiently and the recovered germ fraction may be separated and, if desired, its oil content removed by oil expellers and/or solvent extraction. The process, however, involes a number of screening, bolting and air separations operations which all contribute to the over-all complexity, operational costs and high plant investment involved in the production of cereal flours. Moreover, the yield of flour is only about 70 percetn from an available endosperm content of 85 percent of the wheat kernel, the remaining 15 percent of flour finding its way into a mixture of bran and flour called "shorts."

In general, the usual wet milling process in its several variations as applied to the true cereal and sorghum grains is based on softening of the kernels in an excess of water containing a fermentation inhibitor such as sulfur dioxide, followed by disintegration, flotation and wet screening to separate and isolate the several fractions. Various separations, dewatering and collections methods are used such as settling tanks, starch tables, centrifugal separators, wet screening and rotary filters, which are followed in turn by warm air dryers, dry grinding, separations by means of dry screening, air separators or similar means. The overall-process is quite complex, involving much repetitive handling and reprocessing of the materials throughout their various preparation, separations and recovery stages. There is also the necessity for the use of large quantities of water during the processing steps, and much fuel is required to produce the heat energy and electric power needed in evaporation, drying, centrifuging and miscellaneous other operations.

While wet steeping and processing yields some byproducts of commercial value which result from the concentration of steep waters and the chemical and physical modifications of gluten fractions which occur in the aqueous medium due to sulfur dioxide and enzymes, the value of such products does not offset the additional costs, problems and plant investment in equipment and corrosion resistant materials of construction which the wet milling process requires when similar comparisons are made between wet processing in aqueous media and the applicant's new set processing in the presence of a substantially nonaqueous extractive solvent as hereinafter described.

Generally stated, the present invention includes:

(a) An improved process applicable to the milling of cereal grains from the group comprising wheat, maize or corn, rye and the sorghum grains, wherein the bian coat is removed in a substantially nonaqueous solvent medium so that milling of the germ fraction and pericarp from the grain is effected simultaneously with the extraction of a substantial amount of the fatty content;

(b) An improved process for subsequently separating, further extracting, desolventizing and recovering the unbroken and larger broken milled kernels which may be screened, stored and/or packaged for disposition without grinding, as in the case of bulgur wheat; or whether broken or unbroken, may be ground and classified in the production of meals and flours. e.g. corn meal, corn flour and the various grades of wheat and rye flours;

(c) An improved process for further separating and recovering the fibrous, porteinaceous and starchy components of cereal grains which are produced by the improved milling operation, as hereinafter described, or which are produced from any other type of milling process, such separation and recovery being accomplished by the wet grinding, screening, fine grinding and separating of said fibrous and proteinaceous components from the main starch component in a volatile solvent medium;

(d) An improved process for the recovery of solvent and cereal oil which are contained in the excess of miscella generated in the foregoing extraction steps, a portion of said recovered oil being available for recycling to the mililng process for use as a bran coat softening agent.

More specifically, it is an object of the present invention to provide a grain milling process which is applicable to the cereal grains comprising wheat, maize, rye and the sorghum grains and which utilizes an extractive solvent to accomplish better separations and higher yields, with minor exceptions, of the same products which are obtainable from existing dry and aqueous wet milling processes at substantially lower operational and plant equipment costs; the process eliminating the need for the use of water for steeping and separations which obviates the requirement of removal of water from the final products, eliminates the losses of grain constituents in waste waters due to the actions of chemicals and enzymes in an aqueous processing medium and eliminates corrosion problems which occur in an aqueous medium system.

An important object is to provide a milling process wherein the germ fraction and pericarp or bran coat on the grain are maintained in an increasingly wet and softened condition during milling by the recycling to the milling step of a fat extractive solvent containing a germ fraction and pericarp or bran coat softening agent; the process also contemplating use as the recycled medium of a miscella comprising a fat extractive solvent and a fatty oil content which was extracted in previous extraction cycles.

Another object is to provide a milling process from which the end products represent substantially the extracted bran, oil, starch and protein fractions as they occur in the original grain, and without physical and chemical modifications of these constituents such as result from chemical and enzymic effects in aqueous media processing; said process producing end products of higher stability against rancidity by reason of a lower residual fatty content in the starch and gluten products because of the solvent extraction of the total grain during the milling operation instead of only the germ fraction as in conventioinal wet milling. The process also yields products of superior keeping qualities, odor and color stability than characterize such products as obtained from conventional dry and wet milling processes.

Another object is to provide an improved cereal and sorghum grain milling process wherein the grain is subjected prior to the milling step, to the action of an agent which will soften the germ fraction and the pericarp and thus facilitate its removal in the subsequent solvent extractive milling step.

Another object is to provide a solvent extractive milling process which employs a novel solvent extraction process that is particularly adapted for use on cereal and sorghum grains which contain relatively low contents of fatty constituents, and which are therefore not suitable for flaking and cooking prior to extraction as are done for high oil content oil-seeds such as soya beans, cottonseed, peanuts and other oil rich materials.

Another object is to provide a process which yields products from the milling operation which are free from infestation with live insects and viable insect eggs which later hatch and appear as live insects in the final products. The solvent extractive milling step in the applicant's process thus eliminates a troublesome fault of many flours, meals and feedstuffs derived from conventional processing methods.

The foregoing improved milling process of this invention is primarily directed to cereal grains other than rice and barley and therefore as used herein with respect to said milling process the term "cereal" grains is intended to mean maize or corn, wheat and rye; also as noted, the process is applicable to the sorghum grains.

As will hereinafter appear, the over-all process (as distinguished from the milling process per se) is also applicable to the further grinding, resolution and separation of certain of the by-products of milled wheat, maize or corn, rye, sorghum grain, barley and rice into their respective fibrous, proteinaceous and starchy components.

Solvent extractive milling of rice and barley to produce the milled or "pearled" products of commerce is disclosed in my co-pending applications Ser. No. 308,560, filed Sept. 12, 1963, now abandoned, and Ser. No. 408,702, filed Nov. 3, 1964, now U.S. Pat. No. 3,261,690, issued July 19, 1966. Also my prior Pats. Nos. 3,165,134 and 3,217,769 relate to apparatus for the solvent extractive milling of rice and other cereal grains and oil seeds.

For rice, in particular, the main objectives are the removal of the brown bran coat and the germ while preventing substantial breakage of the whole rice kernels. While a higher yield of unbroken rice is the main justification for the commercial practice of these inventions, there are several other objectives and advantages inherent in the process which were conceived and distinctively designed to meet and overcome the main disadvantages of the conventional dry milling process for rice. The relatively hard, brittle and crystalline structure of the endosperm of the rice kernel requires special handling within a low temperature range in specially designed milling machines in which bran removal and substantial extraction of fatty constituents occur with a minimum of kernel breakage due to thermal and mechanical stresses.

In general, the properties of the cereal grains other than rice and barley, and those of the sorghum grains, to which the present milling process is directed, and also the objectives inherent in their processing into flour, starch, meal and oil differ markedly from the objectives as above explained when milling rice. In the first place, disintegration of the grains is a prime objective and necessity when processing them into flour, starch or meal. Secondly, instead of processing a hard, somewhat flinty and brittle endosperm structure, the endosperm of the other grains contains relatively noncrystalline, somewhat amorphous collections of starch in relatively pure form. When the hard pericarp of these other grains is broken or penetrated to reveal the starchy endosperm, the starch content of the latter is relatively soft and easily disintegrated into amorphous material which may be rolled or ground, or wet slurried into a suspension as practiced in all wet milling processes.

Therefore, applicant's new milling process comprises the simultaneous disintegration and partial extraction of fatty substances from the above identified cereals and sorghum grains in a suitable extractive milling machine in the presence of a recycled stream of oil-containing solvent miscella and accomplishes all of the objectives heretofore stated.

The over-all process not only contemplates the desired separation and recovery of the grain constituents from the extractive milling operation but includes subsequent processing of said constituents.

It is, therefore, a further object of the invention to provide an improved method for subsequently processing the substantially whole milled kernels separated by the improved extractive milling process heretofore described, wherein said kernels are subjected to further extractive steps and are desolventized to produce an improved end product.

Another object is to provide an improved after-milling process for processing the milled kernels separated by the solvent extractive milling operation, wherein the kernels are subjected to further extractive steps, are desolventized, ground, screened and/or otherwise separated to produce special flours and meals; and said process involving a simplified procedure for the production of stable, light colored flours and meals because of the extraction of fats and coloring matter which occurs in the primary milling extraction and subsequent extraction steps of the process.

Still another object is to provide an improved process for processing the fibrous, proteinaceous and starchy fractions which are initially separated by the improved milling operation of this invention or which may be obtained from other primary milling processes or other sources, to remove a substantial portion of the fibrous material and produce relatively pure concentrates of protein and a starch of low protein content, the latter being recovered as separate fractions of the original grain or by-product of grain milling.

Another object is to produce separate fiber, protein and starch fractions which are substantially fat free and are upgraded to provide products having higher commercial value.

Another object is to provide an improved process for procesing fiber, protein and starch fractions of all cereal grains, including rice and barley, to produce a substantially fat-free, light colored protein fraction and also a substantially fat-free, white starch or low protein flour which will be highly stable in storage or in sales containers against darkening, becoming rancid or acquiring insect infestation due to viable insect eggs which were present in the original grain by-product.

The improved process for processing the fibrous proteinaceous and starch fractions may be used to recover additional flour from wheat shorts which are an end product of conventional wheat milling. It may also be used in the recovery of corn, wheat or rice starch from the by-products of starch manufacture. It is further useful in the separation of rice bran and meals obtained from the commercial milling of rice into fibrous, proteinaceous and rice flour fractions; in this latter instance, the undesirable crude fiber with its high siliceous ash content is eliminated to produce a highly desirable rice bran-coat protein concentrate and also a superior rice flour.

The invention further contemplates recovery operations which are applicable to the fine screenings washed from the milled kernels and to the bran coat solids which accumulate in the miscella, and it is a further object to provide an improved process which effectively separates said solids. The solids so recovered are conducted to the after-milling extraction process heretofore referred to, and yield mainly feed stock materials comprising fibrous and proteinaceous materials which have originated from the bran coats of all grains and parts of the horny endosperm of such grains as corn and sorghum grains. Smaller proportions of starch or flour are also recovered in this process.

Following removal of the solids from the miscella, the excess of miscella generated in the extraction steps and containing solvent and cereal oil is subjected to a recovery operation and if desired, a part of the recovered oil may be recycled to the primary milling process for use as a bran coat softening agent. The clarified solvent is directed to storage for reuse.

All of the foregoing objectives may be summarized as providing an improved over-all process for cereal grains wherein the primary milling is applicable to the cereal grains from the group comprising wheat, maize or corn, rye and the sorghum grains and is performed in the presence of an extractive solvent so that oil extraction occurs simultaneously with the milling instead of from a separated germ fraction as has been the practice, said milling being followed by the desired or selected subsequent separation and recovery methods of the various constituents which utilize a solvent medium instead of water to obtain the improved results and advantages which are detailed above, said subsequent separation and recovery methods being applicable to the constituents of all milled grains, including rice and barley. The cereal oil which is extracted by the solvent medium throughout all stages of the process is finally recoverable from the solvent. As will hereinafter appear, it is preferable that the solvent medium circulated within the system is directed in countercurrent flow to the constituents.

Other objects and advantages of this invention will appear from the detailed description, taken in connection with the above drawings wherein:

FIG. 2 is a flow diagram which is a continuation of FIG. 1 and hereinafter referred to as Section II, in which the separation and recovery of fibrous, proteinaceous and starch fractions are accomplished;

FIG. 3 is a continuation of FIG. 1 and may be related to FIG. 2 and is hereinafter referred to as Section III, wherein the solids are recovered from the miscella;

FIG. 4 is a flow diagram of that portion of the process relating to the separation and recovery of the cereal oil and solvent, hereinafter referred to as Section IV, and illustrating the relationship and/or recycling of the solvent and the recycling of a portion of the cereal oil to the primary milling process;

FIG. 5 is an enlarged longitudinal sectional view of the extractive milling machine; and FIG. 6 is a horizontal, cross-sectional view, taken on the line 6—6 of FIG. 5.

SECTION I.—RECOVERY OF WHOLE OR BROKEN MILLED KERNELS

Figure 1:
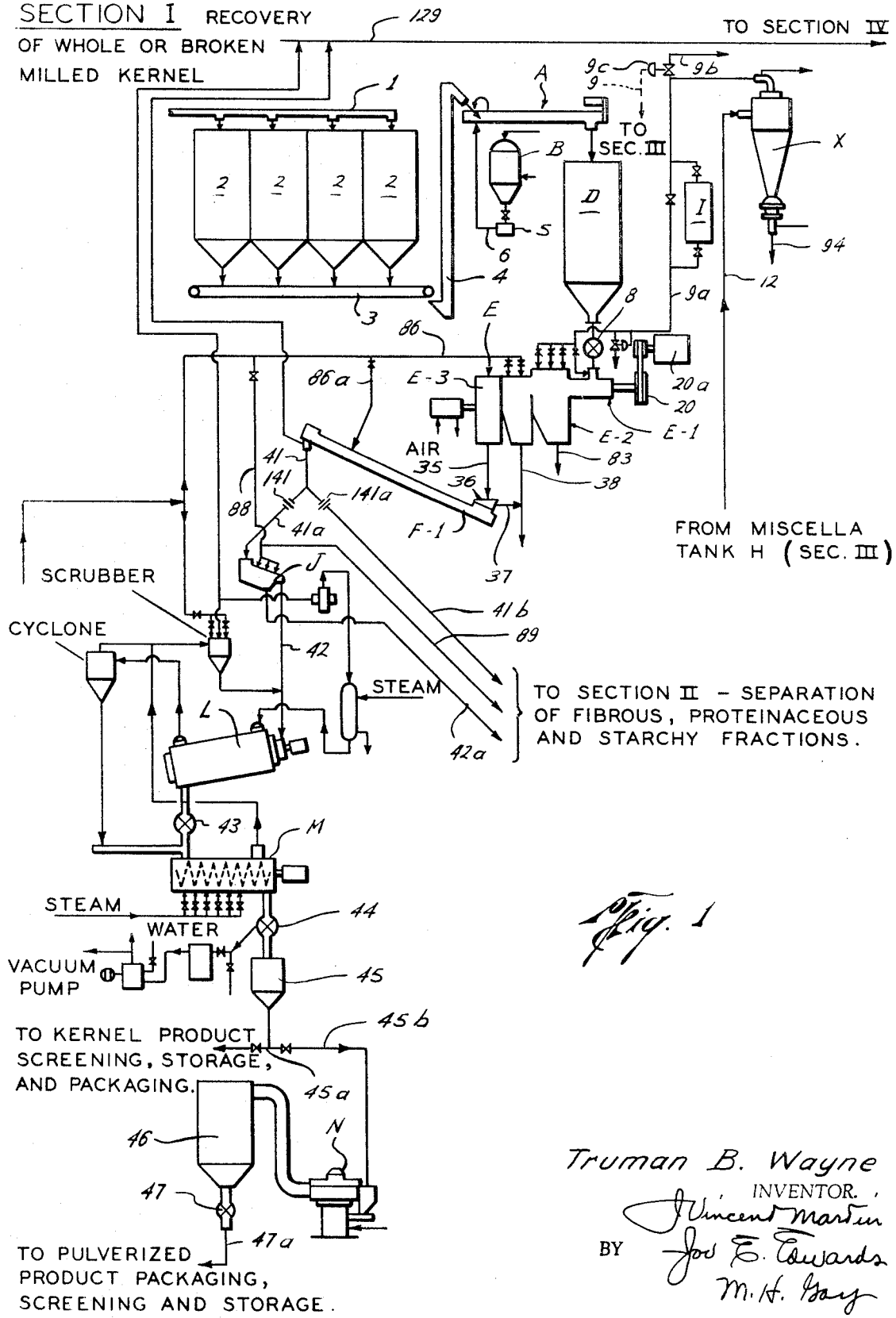
FIG. 1 is a flow diagram of that portion of the system, hereinafter referred to as Section I, which illustrates the extractive milling process and the recovery of and subsequent processing of the whole or broken milled kernel.

Section I, as illustrated in FIG. 1, relates to a process including milling, which is applied to the cereal grains, such as wheat, maize or corn, rye and the sorghum grains. The process comprises the softening and partial to almost complete removal of the bran coat in a substantially nonaqueous medium consisting of a recycled, oil-containing miscella which is recirculated to the milling operation. It further relates to the alternative procedures of subsequently separating, further extracting, desolventizing and recovering the unbroken or mixture of unbroken and larger broken milled kernels which may (a) be screened, stored and/or packaged for disposition without grinding, as in the case of bulgur wheat; or (b) the grinding and classifying of the milled kernels, broken and/or unbroken in the production of meals and flours, e.g., corn meal, corn flour and the various grades of wheat and rye flours.

In the drawings, and referring first to FIGURE 1 and 2, thoroughly cleaned, washed and dried wheat, rye, corn (maize) or sorghum grain (kaffir corn or milo) which may be either the raw or parboiled kernels, or "berries," are transported by conveyor 1 to the clean grain silos 2. Parboiling followed by drying to 10 to 14 percent moisture is practiced when producing bulgur from wheat, or bulgur-like products from the other cereal grains. However, when meal, flour or starch are to be produced, wheat and the other cereal grains are not parboiled, but instead may be tempered or conditioned by the use of moisture and heat in accordance with conventional methods.

The grain is recovered from the clean grain silos by means of conveyor 3 and elevator 4, and is delivered to mixing apparatus A which may be any suitable type of mixing conveyor or mixer. The latter is steam jacketed to allow heating of the grain while it is being mixed with the bran-coat softening agent which is withdrawn from its storage tank B by means of proportioning pump 5 and pipe 6. Tank B is equipped with a heating coil and is preferably jacketed with insulation to maintain the temperature of the bran-coat softening agent within the desired temperature range. Since the bran-coat softening agents are either substantially nonaqueous or else are used in relatively small proportions ranging from 0.5 to 5.0 percent when in aqueous solutions or emulsions, the action of these agents on the bran coat is very different from the use of water and heat when tempering or conditioning as in ordinary wheat milling. Consequently, higher temperatures ranging up to 212° F., or even higher, may be used to facilitate the removal of the bran coat. The lower range between 120° F. and 180° F. is preferred when processing wheat or rye and the higher temperature range of from 160° F. to 212° F., and higher, is preferred when processing corn and the sorghum grains which have thicker, denser bran coats and/or horny endosperm areas which are penetrated and softened with greater difficulty.

As will hereinafter appear, the bran-coat softening agent is usually the cereal grain oil corresponding to the grain being processed and has been extracted therefrom in a previous cycle, or it may be one or a mixture of the other agents.

The treated grain is discharged from the mixing and heating operation in mixing apparatus A into the holding tank D where it remains until the bran-coat softening agent has sufficiently penetrated and softened the outer bran coat.

The treated grain from holding tank D is delivered through the rotary feeder 8 into the solvent extractive milling machine E. Rotary feeder 8 provides an effective vapor lock between holding tank D and the succeeding equipment where volatile solvents are introduced.

Extractive milling machine E comprises a feeder section E–1, a wet milling section E–2 and a washing section E–3 where the whole and/or broken milled kernals received from the wet milling section are washed with dilute miscella received from the final extraction stage where fresh solvent is introduced. Section E–1 is provided with a suitable inlet for receiving grain from rotary feeder 8, and this inlet connects with pipe 9a through a valve and nozzle for the introduction of clarified strong miscella into the entering grain. Pipe 9a also supplies the miscella through a plurality of flow control valves and spray nozzles into the milling section E–2.

The clarified strong miscella is produced in wet cyclone X, or its centrifuge or filter equivalent, from settled strong miscella received from strong miscella settler H (shown in FIGS. 3 and 4, Sections III and IV) by means of pipe 12, pump 11 and pipe 10. The clarified miscella from cyclone X is discharged into pipe 9a and by means of suitable valve settings may all or in part pass through heater I to raise its temperature or may entirely bypass said heater. Since the medium miscella from the first stage centrifuge (to be described later) is continuously entering the strong miscella settler H, a suitable level is maintained in it by means of level controller 9 which controls the setting of level control valve 9c. Any excess of settled strong miscella in settler H will cause level control valve 9c to bypass the excess through line 9b which delivers it to the solvent and oil recovery operations of Section IV, to be later described. This excess of strong miscella could, by means of a suitable gravity flow arrangement, overflow settler H at the location indicated for level controller 9 and flow to a feed tank preceding the miscella filters G of Section IV.

The structural details of the extractive milling machine E are shown in FIGS. 5 and 6. The degree of milling and disintegration of the grain kernels which occurs in section E–2 of the extractive milling machine E is determined by the clearance setting between the stationary perforate and/or roughened stator 13 and the rotor 14, the speed of rotation of shaft 16 to which are attached the rotor 14 and the feeder spiral scroll 15, and the relationship between the rotor-stator clearance and the points of greatest diameter and length of the grain kernels being milled. Various types of perforate, slotted, reversely indented, dimpled, spiked and other surfaces may comprise the milling surface of the stator, and likewise the rotor may have a plurality of horizontal or spiral ribs, spikes or other surfaces which cooperate with the surface and contour of the stator to produce the degree of disintegration of the grain which is desired.

To accommodate grains ranging in size from that of the sorghum grains upward to corn (maize), the clearance between the ribs, spikes or other surface characteristics of the rotor in its proximity relationship with the surface of the stator should be adjustable over the range of from $3/32$ inch to $9/16$ inch. The most generally useful construction is a rotor having from 4 to 8 horizontal or spiral flights or ribs which extend vertically approximately ¼ inch from its surface plane, and a perforate metal stator having punched slots from $5/16$ inch to 1 inch long and from $3/64$ inch to ¼ inch wide arranged in parallel, side staggered or spiral pattern. Obviously, the smaller hole patterns are used on sorghum grains, the intermediate hole patterns on wheat and similar grains, and the larger hole patterns are used on dent corn where the degerminating effect is the primary objective in the initial milling stage.

The clearance between rotor 14 and stator 13 is adjusted by means for moving shaft 16 horizontally through the matching splines 19 and 19a on shaft 16 and in the hub of sheave 20, respectively. The sheave 20 is held in fixed position by two bearings 21 and 21a through which shaft 16 is closely fitted, but which allow lateral movement of the shaft through these bearings. At the opposite end of shaft 16 is bearing 22 which is press fitted into machined cylindrical bearing housing 23. This housing is moved horizontally within fixed sleeve 24 by means of the attachment of plate 25 to cylindrical bearing housing 23 and jack 26. This high ratio screw jack is adjusted by crank 27 which moves the shaft assembly approximately $1/100$ inch per revolution of the crank. Any other suitable mechanism which provides incremental movement of shaft 16 in a horizontal direction is an equivalent of the device above described.

The speed adjustment is preferably provided to drive sheave 20 by means of a variable speed drive arrangement 20a.

As noted, clarified strong miscella is introduced into section E–2, preferably through nozzles 17a which are mounted in outer housing 18 and contacts the cereal grain being milled in said section. The main concentration of fatty substances in the miscella is discharged from section E–2 through the chute and discharge pipe 83.

The milled cereal grain after leaving section E–2 acmulates sufficiently in the swaged outlet in compartment 28 to exert pressure on discharge gate 29 and oppose the pneumatic or hydraulic pressure which is acting against the piston in cylinder 30. When this pressure on discharge gate 29 exceeds the operating back pressure supplied by cylinder 30, gate 29 will recede and allow the milled grain to enter section E–3 above discharge screw 34 where it is washed with dilute rinse miscella from pipe 86 which is provided with several small, wide angle spray nozzles 86a, (FIGS. 5 and 6) placed at 120° intervals around the cylindrical section of Section E–3 and in its discharge chute. Most of this rinse miscella, now strengthened as to its oil content, leaves the washed milled grain through the perforations in a 120° bottom section 134 of conveyor 34 which is driven by motor reducer 34a. The rinse miscella discharges through discharge pipe 38.

The pressure setting against discharge plate 29 exerted by cylinder 30 is regulated and controlled by adjusting the air or fluid pressure at control valve 31, pressure controller 32, and air vent valve 33. The latter will admit air to the front side of the piston in cylinder 30 when the piston recedes and will bleed air from the front of the cylinder when the piston advances in cylinder 30. Usually, an air pressure of 30 p.s.i. on the downstream of control valve 31 is sufficient for milling the most refractory grains. Wheat, for instance, may be satisfactorily milled when the pressure is maintained at about 5 p.s.i. Other pressure application devices such as springs and various forms of linear actuators are also contemplated in lieu of air or hydraulic cylinders.

The solvent-rinsed, milled grain is discharged through conveyor outlet and discharge chute 35 into the receiving hopper 36 of conveyor F–1, the latter preferably being inclined to allow residual rinse solvent to drain back into solvent and vapor tight hopper 36 from which, by means of overflow pipe 37, it joins the mainstream of rinse solvent in discharge pipe 38 extending from section E–3 of the milling machine E. The rinse solvent so collected, which is now sufficiently strengthened with dissolved oil to comprise the weak miscella, is collected in the hopper 39 (FIG. 2, Sec. II) and overflows through pipe 40 into weak miscella tank K.

In simultaneous milling and extraction, the solvent miscella performs the following functions:

(1) The extraction and removal of a substantial proportion of the fatty and coloring constituents from the germ fractions and the outer layers which enclose the starchy endosperm.

(2) Flushes away the fine particles which have been removed by interparticle friction, and by the milling action between the rotor and the screen or perforated metal stator.

(3) Greatly reduces wear on machine parts due to the lubricating and cleaning effects of the miscella.

(4) Prevents clogging of the mill screen.

(5) Kills all forms of insect infestation.

(6) Allows the selective removal, segregation and recovery of the several grain components without the use of water in substantial amounts.

The outer layers of the unmilled kernels, herein described as the pericarp, include the several layers of the mesocarp, the spermoderm, perisperm, the aleurone layer cells and the various other cellulose and pentosan cells which comprise the outer bran coat on cereal grains such as wheat and rye, and somewhat differently on corn and the sorghum grains, are disintegrated in the extractive milling operation in the presence of the solvent miscella to the extent required by the main end product, i.e., whether it is to be a relatively fine flour, starch or meal, or whether the original grain is to be substantially degermed and the pericarp layers are to be partially or wholly removed while substantially preserving the whole milled kernel, which milled kernel comprises the endosperm. The latter conditions would, of course, be employed when preparing a cereal grain for the parboiling process used in the production or "bulgur" from wheat or bulgar-like products from other cereal grains, or when after-milling the parboiled grain in the production of such products. They would also apply when it is desirable to de-germ, mill, solvent extract and desolventize the substantially whole milled kernels which are subsequently ground and subjected to screening and/or air separations in the preparation of special flours and meals. Applicant's process now makes possible this simplified production of stable, light colored flours and meals because of the extraction of fats and coloring matter which occurs in the primary milling extraction and subsequent extraction steps of the process.

In this process there is no need for the separate removal, isolation and solvent extractive treatment of the germ fraction as is inherent in both the dry and wet conventional processing of cereal grains. Instead, the germ is removed and solvent extracted simultaneously with the pericarp layers, and the extracted germ residue thus directly enters and becomes a constituent of the larger proportion of protein-rich bran by-product derived from the production of specially milled whole cereal grains or of the comminuted flour, starch or meal products of commerce.

Where the solvent extractive milling is carried out, the grain is not presoftened in an excess of steeping waters containing a preservative chemical for a period of several days before milling as is practiced in conventional wet milling process. Instead, the grain may receive a pretreatment with a relatively small proportion of a liquid bran coat softening agent or an agent which dissolves or disperses in a carrier liquid or melts at the processing temperatures herein disclosed. As an alternative to the above described pretreatment, the germ and the pericarp may be softened during or just prior to the milling operation by the oil-containing solvent miscella which is circulated in contact with the grain at temperatures ranging between 140° F. and as high as 220° F. at pressures above atmospheric under certain conditions when treating grains which have harder, less easily penetrable husks or pericarps. Lower temperatures than 140° F. may be used but this will slow the operation. Higher temperatures than 220° F. will involve more costly, higher pressure apparatus and may cause darkening of the end products. Usually, a temperature range beginning at 140° F. and having an upper limit corresponding to the boiling point of the miscella will provide optimum conditions for softening the germ and pericarp preparatory to milling.

It should be understood that when processing these cereal grains in a substantially nonaqueous medium the properties of the bran layer, horny endosperm and gluten are not substantially altered as when large volumes of water are used in the conventional wet milling processes to facilitate the separation of these proteinaceous and fibrous components from the starchy parts of the endosperm. Instead, these several components are separated by physical means which do not involve substantial water absorption and selective settling or centrifuging from an aqueous medium. Thus, there is a distinct departure at this initial processing stage from the conventional wet milling practices.

As explained, the presoftening process comprises wetting of the grain with a bran coat softening agent in a suitable mixing apparatus and then maintaining them in contact at a suitable temperature until the bran coat is sufficiently softened. The bran coat of tempered or conditioned wheat is more easily penetrated and softened than that of the sorghum grains; consequently its holding time will range between 1 and 4 hours depending on the holding temperature. However, the sorghum grains, unless similarly tempered or conditioned, will, for best results, require a longer period ranging from 4 hours upward. A satisfactory test for the degree of softening is simply the ease with which the bran coat may be scraped from the starchy endosperm with a pocket knife or the thumb nail.

The length of the softening period that is required will vary not only with the treating temperature, but also with the temperature of the recycled miscella, as will be hereinafter described, which is sent to the extractive milling machine. This strong miscella is in fact not strong in the sense that are the strong miscellas from the extraction of soya beans and other oil-rich oil seeds. Its oil content will usually vary between 7 and 15 percent, this depending very much on the oil content of the original grain, and the remainder is the solvent which is usually hexane but may be another substantially nonaqueous hydrocarbon or alcohol, as will hereinafter be described. The solvent miscella actually penetrates the bran coat faster than the oil, per se, but unless the bran coat softening step is conducted under pressure, the boiling point of its solvent imposes a temperature limitation. Therefore, the most practicable procedure is to treat the grain in the mixing apparatus at as high temperature as may be used without adversely affecting the properties of the proteinaceous material or causing darkening of the starch and soluble sugars.

The germ and the pericarp of the cereal grains may be softened by any single agent or combination of agents in undiluted form or when dissolved in water or organic solvents. For example, nontoxic oils are excellent softening agents, and these include highly refined mineral oils and edible vegetable oils. Naturally occurring or synthetic esters of glycerol, propylene glycol, polypropylene glycol or aqueous solutions of alkaline salts such as hydroxides and carbonates of ammonium and alkali metals or of soaps of higher fatty acids may be used as softening agents as well as aqueous solutions of neutral salts of ammonium, sodium and potassium. Very dilute aqueous solutions of one percent concentration or less, of hydrochloric, sulfuric, phosphoric and citric acids or other acids which are nontoxic in the small proportions used are also good softening agents. Even water, preferably containing a small proportion of a wetting agent, and used in quantities just sufficient to soften the bran layers, is useful, especially if the grain has not been tempered before entering the process.

When such softening agents are used, the germ and bran are milled from the grains in the presence of both the softening agent and a volatile organic solvent effective to extract fatty components from the bran and germ. When a cereal oil is recovered by the practice of the present invention, recycled cereal oil, or strong miscella, i.e., a strong solution of the cereal oil in an organic solvent, is a preferred softening agent since it is produced in the process and recovered from the cereal grain at low cost so there is little reason for using any other softening agent.

Use of recycled cerial oil in strong miscella also avoids the necessity of a presoftening step prior to the milling stop when only a small amount of bran is to be removed from the kernels. Strong miscella introduced into the milling machine E during the milling step and in contact with the grain therein will soften and loosen the germ and bran to a degree sufficient to improve the milling when only a small proportion of the bran is to be removed from the grains having hard, dense pericarps; or when more completely milling tempered or conditioned grains such as wheat which have less dense bran coats.

When using the recycled strong miscella, which may or may not contain in addition to the cerial grain oil an extraneously added bran-coat softening agent, if the recycled miscella does not contain a predominantly hydrophilic bran-coat softening agent it is preferable to subject the cereal grain, whether wheat, corn or the sorghum grains to a preliminary tempering or conditioning step such as is commonly used when preparing wheat for the conventional dry milling process. However, this moisture addition is preferably not carried to the point where there is a substantial softening of the starchy endosperm, as this would resemble the usual steeping process for corn and the sorghum grains.

The preliminary extractive milling step occurring in milling machine E allows an initial, quite effective separation of the germ and bran coat constituents from the whole milled kernel, leaving the starchy endosperm section in whole and large broken pieces which do not penetrate the mill screen and are recovered thus largely freed from the germ, fibrous and proteinaceous fractions.

The proportion of bran-coat softening agent used in treating the grain is not critical, but will vary with the type of agent being used. For example, if recycled cereal oil in a solvent miscella is used, the amount of bran-coat softening agent in the quantity of miscella used is not determining and is secondary in importance to the quantity of the miscella required for the extraction, cooling, flushing and transporting of solids by the miscella. If presoftening is accomplished with recovered cereal oil, there is no reason to use more than is required to thoroughly wet and soften the bran layer. As littel as 0.5 percent of oil based on the weight of the grain is often sufficient on the softer cereals, such as wheat, and there is no reason for using in excess of 5.0 percent of total solution inclusive of the additive and its solvent vehicle if the latter, such as water, adds to the total softening effect.

In general, therefore, the proportion of bran-coat softening agent to grain, except where the agent is an inherent constituent of a recycled process miscella, should be kept within the limits of 0.5 to 5.0 percent. Larger quantities may not produce any harmful effects, but there is simply no advantage in using more than is required in view of the presence in the process of oil-containing miscellas which contribute substantially to softening effects.

The above mentioned range of proportions applies to the bran-coat softening agent which is added subsequent to any preliminary tempering or conditioning of the grain. Often in the latter processes, the moisture content of the gluten or other proteinaceous bran layers is substantially increased. The main advantage of thus increasing the moisture content of the bran layers other than the softening effect, is that the specific gravity of the moisture-containing gluten and other proteinaceous materials is reduced below their normal specific gravity of approximately 1.226. Since nonhydrated starch has a specific gravity of about 1.55, the separation of the gluten from the starch in the centrifuges is somewhat facilitated.

Any organic solvent which is effective to extract fatty components from the cereal grain during the milling process may be used provided the solvent has sufficient volatility that it may be completely removed from the grain products and bran at temperatures below that at which the milling products are damaged. Among the preferred solvents are low boiling, highly refined petroleum fractions, such as n-hexane and n-heptane. In addition to nonpolar solvents of this type, polar solvents, such as alcohols, the lower boiling point ketones and ethers, may be used; as for example, ethanol, isopropanol, acetone, ethyl ether, and isopropyl ether. Chlorinated hydrocarbons as for example, chlorinated ethers, ethylene dichloride and trichloro ethylene also may be used, but are not preferred because of their higher boiling points. Mixtures of such solvents, especially mixtures of polar and nonpolar solvents, are especially useful.

Instead of employing a pure, relatively anhydrous solvent, the extraction may be accomplished with a solvent or solvent mixture which will dissolve a smaller proportion of water, preferably to form a constant boiling azeotrope. An azeotropic solvent is conveniently handled in this process since it tends to provide a constant boiling, uniform extracting medium containing a small percentage of water which aids in the wetting and penetration of the bran layers, and yet does not contain or substantially impart free water to the hydratable constituents, e.g., starch, sugars, etc., of the inner aleurone layer and the starchy endosperm. Any excess of water picked up from the cereal grain by condensation from air and/or from other sources is lost in an azeotropic distillation step during recovery of the solvent.

The proportions of extractive solvent to grain may be varied somewhat for the different grains. For instance, wheat which contains from 1.5 to 2.0 percent of lipids will, from the standpoint of producing a substantially fat-free flour, require less solvent in the final extraction stages than will corn which contains from 4.0 to 5.5 percent of lipids when used in corn starch production. However, the fat content is, in itself, not necessarily the governing factor in solvent proportions since there are inherent factors in the process such as in the handling of slurries, cooling of the solids during milling, flushing of mill screens and the height of liquid columns above sludge layers in the settlers, hereinafter referred to, required to obtain a sufficiently settled miscella for recycling to the mills. Solvent azeotropes must not contain sufficient water to prevent the solvent from being an active extractant for the cereal oils.

In any event, the proportion of solvent to grain solids in process is not critical, but the practicable operating range is from 75 to 150 parts of solvent to 100 parts by weight of grain. The lower proportion is about as low as will allow operations which are in most respects satisfactory, but 100 parts is a more advantageous proportion. The highest proportions above 100 parts are applicable to the higher density solvents such as chlorinated ethers and other higher boiling solvents.

The extractive milling machine may in some applications of the applicant's process be any of several commercially available wet milling machines which are capable of being set at varying clearances of their grinding surfaces, and which may be modified to provide a liquid and gas tight apparatus. Single and double runner attrition mills, various forms of disintegrators, hammer mills, etc. are suitable, particularly when it is desirable to grind the grain under solvent extractive conditions to effect separation of its fibrous, proteinaceous, starchy and fatty constituents, and to recover these fractions separately. However, it is usually desirable to preserve the grain in substantially its original size and shape while milling off part or most of its outer bran coat, even though during subsequent processing stages the milled kernels will be ground to effect further separations and recoveries of the grain's components.

As explained, and as shown in FIG. 1, the main mass of drained, solvent extractively milled grain is discharged through conduit 35 into conveyor F–1; the conveyor carries the milled grain upwardly through the conveyor from which it is discharged through chute 41. At this point, by proper selection of open and closed slide gates 141, 141a, or the like, it may be sent by means of chute 41a to vibratory or reel-type screen J for further washing with solvent from pipe 88 preparatory to final processing as predominantly whole grains and large fragments. Thus, if whole grain bulgur from wheat kernels or large fragments of de-germed, cracked corn are being processed, the grain is discharged from screen J through chute 42 to desolventizer L. This desolventizer may be any of the commonly used types but is illustrated herein as the rotary type wherein the solvent-wet grain enters at the upper end and progresses to the discharge end where it enters vapor lock feeder 43 and discharges into the second stage desolventizing and deodorizing drum M where the remaining traces of solvent are removed. The desolventized grain is then discharged through vapor lock 44 into hopper 45 from which it may be directed through pipe 45a to product screening, storage and packaging. Thus, a desired milled kernel product is produced.

It is noted that the desolventizer L and deodorizer M are well known and the flow diagram illustrates the cyclone, scrubber and other equipment associated therewith; however, since such apparatus is familiar to those skilled in the art, it is not believed necessary to describe the same in detail.

When the desolventized grain discharging from the product hopper 45, is to be pulverized and classsified, the discharging material passing from the hopper may be directed through pipe 45b to the pulverizer and classifier system generally indicated at N. The pulverized and classified material is then sent to collector 46, from which it is withdrawn through the rotary air lock 47 to product conduit 47a. From conduit 47a, the material is sent to screening, storage and packaging or to further processing, as desried.

In general, cereal products such as bulgur are not further comminuted, but when wheat, rye or corn flour, or corn grits are prepared, the product is ground and may be sifted, bolted and/or centrifugally air classified to effect the required separations of products.

SECTION II.—RECOVERY OF FIBROUS, PROTEINACEOUS AND STARCHY FRACTIONS

If the grain is to be ground in a mill for separation of the starch fractions from the proteinaceous and fibrous fractions, the extractively milled grain is directed through chute 41b (FIGS. 1 and 2) and chute 41c to a single runner attrition mill or disintegrator O where where a semi-fine grind is obtained. The ground material then passes to vibratory or reel screen P where it is washed on the screen cover with solvent from pipe 89 to remove the fines, largely starch, which are discharged through pipe P–1 into weak miscella slurry tank K where they join the similar material derived from screen J shown in FIG. 1 by means of chute 42a. The solvent in pipe 89 is supplied from pipe 88 which also directs solvent to the screen J, as has been described.

The coarser material, which is largely fibrous in nature, remaining on the screen cover of screen P is transferred by means of mixing screw conveyors 48 and 48a directly through chute 49 into an agitator-equipped third stage mixer 50 where it is mixed with the protein and residual fiber slurry from pipe 51, pump 52 and a second stage centrifuge T–2. From mixer 50, the slurry enters a fine grinding, double-runner attrition or other wet milling machine R in which the grain solids are finely ground in order to facilitate separations which will follow. Centrifugal pump 52 receives the centrifuge wash solvent from tank 53 through line 53a in whatever volume is needed when supplementing the solvent which contains the fiber and gluten (or proteinaceous) solids overflow from centrifuge T–2. The overflow stream from said centrifuge is delivered to pump 52 by means of pipe 54.

It has been found that separation is facilitated when the added moisture content is within the range of 20 to 30 percent of the combined weight of the fiber and protein fractions. However, processing may be accomplished at moisture contents up to 200 percent of the combined weight of fiber and protein at a temperature below the gelatinization of the starch.

Although all separations between the fiber, gluten or protein and starch components are made in substantially nonaqueous liquid media, the addition of a small proportion of readily absorbable water will assist in the separation of the fiber over the series of screens S–1, S–2 and S–3 shown in FIG. 2 which will be later described, and will also assist in the separation of the gluten and residual fiber in the two-stage centrifuging operations in the second stage centrifuge T–2, as well as in a first stage centrifuge T–1. A metered quantity of water, which is preferably equivalent to the weight of fiber and gluten is the slurry entering the fine grind wet mill R, is introduced into the feed inlet of mill R through line R–1 and is dispersed into the slurry. The starch cells do not imbibe water and undergo swelling at the temperature of the slurry, which for this reason is maintained at temperatures between that of ambient conditions and not in exces sof 160° F., but preferably under 140° F. where some of the lower molecular weight starch molecules begin incipient gelation.

The addition of the water is thus preferably made in the fine grind wet mill R where it is finely dispersed and more readily absorbed preferentially by the fiber and gluten. However, it may be employed less effectively in the third stage mixer 50 or in any of the preceding processing steps such as in the first stage wet mill O, or the water may be proportioned to enter at several such points. The quantity of water added should not exceed twice the weight of the combined fiber and gluten because larger proportions cause the formation of emulsions which break later and may introduce difficulties due to free water in the system. In any case, it is preferable to avoid water additions to oil-containing miscellas in excess of the small quantity which can be absorbed by the miscella fines to increase their settling rates in the full miscella settler H (FIG. 3) and in the weak miscella settler K (FIG. 2).

When the moisture content of the grain has been increased by tempering or conditioning prior to milling, the moisture increase of from 1 to 5 percent of the weight of the grain thus introduced, and which is roughly equivalent to from 6 to 30 percent of the weight of the combined fiber and protein fractions, should be taken into account and the amount of water added should be correspondingly decreased. The added moisture content, exclusive of that in the original untreated grain, will appear in the final fiber and gluten by-products and is removed in the desolventizers together with some of the original bound moisture in the grain.

The finely ground slurry from mill R is collected in pump tank 55, and by means of pump 56 is directed through pipe 57 into the first unit S–1 of several fiber-removing screens which are arranged in a series comprising not less than three and preferably five stages. The screens may be of the shaker or other types, inclusive of the stationary curved sieve type now commonly used in de-fibering cane juice in sugar manufacture. From 40 to 60 percent of the screens comprising the series are fitted with fine phosphor bronze, monel, nickel, stainless steep or plastic screen cloth; or if the screen is of the stationary curved sieve type it is provided with outward tapered, wedge-shaped, parallel bars having an effective opening diameter of approximately 50 to 75 microns. The remaining screens which comprise the final screening stages should have an effective opening diameter which is approximately 50 percent larger so that the final washing of the fiber to remove the residual starch and gluten may be accomplished. The countercurrent flow pattern eventually removes any fiber which may pass the larger openings, and the starch and gluten are finally obtained from the first stage screen.

The drawing illustrates a three stage fiber-screening operation in which the stages are represented by screens S–1, S–2 and S–3, respectively. The starch and gluten slurry leaves screen S–1 through pipe 58 and enters first centrifuge stage mixer 59, and the fiber discharges through duct 60 into the upper end of screen S–2 where it is washed with the screened slurry from screen S–3 which pump 61 distributes over screen S–2 by means of the sprays on pipe 62. Screen S–2 delivers its screened slurry through pipe 63 to pump 64 which elevates the slurry through pipe 65 from which it is sprayed over the cover on screen S–1.

The fiber from screen S–2 is delivered through duct 66 to screen S–3 where it is washed with fresh solvent from pipes 67 and 67a in controlled amount and delivered through duct 68 either to conveyor 68a which delivers the fiber to a separate desolventizer system (not shown), or preferably combines it with the preponderantly protein slurry in pipe 69 which delivers the combined materials to centrifuge U which extracts most of the solvent, delivers the extracted protein solids which still contain from 30 to 40 percent solvent to screw feeder 70 and discharges the solvent through pipe 71 to the solvent tank 53.

Screw feeder 70 discharges the solvent-wet protein and fiber solids to duct 70a wherein they are entrained in the recycled, superheated vapor steam and collected in the desolventizer cyclone collector 79. After depositing its solids in collector 79 the recycled gas stream enters blower 81 and is forced through recycle vapor heater 80 where it is superheated to a temperature within the range of 240° F. and 340° F. and returned to duct 70a and the cycle is repeated in desolventizer system Q.

The wet-ground, screened slurry of finely-ground solids from screen S–1 enters first stage mixing tank 59 and is fed as a regulated, well-mixed slurry to the first stage centrifuge T–1 from which the overflow is passed through pipe 69 to centrifuge U where the protein and fiber solids are separated and delivered to the screw feeder 70 which supplies a desolventizer system generally indicated by the letter Q. The protein and fiber constituents which enter the desolventizer system Q are recovered in holder 72 and are discharged through vapor lock feeder 73 and discharge conductor 73a and sent to storage from which it is sold in bulk or after bagging as stock feed.

The underflow from centrifuge T–1 consists mainly of starch slurried in fresh solvent wherein the starch solids together with a smaller proportion of fiber and gluten receive a solvent wash from pipe 74. The starch slurry, still containing impurities, is delivered through pipe 174 to second stage mixer 75 wherein it is reslurried with fresh solvent from pipe 74b and discharged through pipe 75a to the second stage centrifuge T–2 where the final separation of the remaining amounts of fibrous and proteinaceous material from the starch is effected. The solids are washed with solvent from pipe 74a and the overflow containing the impurities is sent to pump 52 through pipe 54 and is delivered to the mixer 50 through pipe 51 where it is used to slurry the screenings from screen P which are delivered by means of conveyors 48 and 48a, as has been explained. A pump 85 having its inlet connected with wash solvent tank 53 and also having a final wash solvent discharge pipe 86b connecting with the pipe 67 may supply wash solvent or a mixture of fresh solvent and final wash solvent from solvent separator 109 and tank 53, respectively, to the mixer 50 at inlet chute 49 (FIG. 2).

The solvent-washed starch underflow from centrifuge T–2 is conducted through line 175 to the starch centrifuge V where the excess solvent is removed. The starch solids, still containing about 35 to 45 percent solvent, are discharged through line 76a into screw feeder 76 which delivers to the starch desolventizer system W through line 76b. The solvent is removed in the system W and the starch is recovered from starch holder 78 by a suitable air lock feeder 77 and is conducted through discharge line 77a to further processing, if required, to remove the water soluble sugars, etc. and the last traces of fibrous and proteinaceous impurities by reslurrying in water, screening, filtering or centrifuging and drying in the manner used in the final purification stage of the conventional wet milling process which has been in use for many years. However, unless the starch must be very pure for special uses, the starch from the starch desolventizer system W is simply recovered from the holder 78 and sent to the usual screening, finishing and packaging operations. The starch thus produced is suitable for most industrial and food uses where a small content of soluble constituents, mainly sugars, is not objectionable.

The two desolventizer systems Q and W are shown as being the flash evaporative type wherein the solvent-wet materials are desolventized while being transported in a high velocity stream of superheated solvent vapor, or solvent vapor and inert gas. Each system is substantially identical except for size and relative capacity, and comprises desolventizing cyclones 79 and 79a, recycle vapor heaters 80 and 80a, blowers 81 and 81a, vapor lock discharge feeders 82 and 82a, and condensers JJ and KK (shown in FIG. 4, Section IV and referred to in more detail hereinafter) respectively, and the necessary steam and vapor piping which are not part of this invention.

The foregoing description of Section II of the over-all process has been described as effectively separating the fibrous, proteinaceous and starchy fractions derived from the extractive milling of the identified cereal and sorghum grains which are adaptable for milling in the milling machine E. However, this Section II of the process is applicable for use in processing cereal milling products produced by methods other than milling machine E, or obtained from other sources.

When by-products of cereal milling which are characterized by relatively low contents of fatty substances are available and it is desired to process such by-products into their separate fibrous, proteinaceous and starchy components with recovery of their smaller content of fatty substances, said by-products may be subjected to the process of Section II. An example of by-products from other sources is rice bran derived from the solvent extractive milling process for producing substantially whole kernels of rice, as described in my co-pending applications Ser. No. 308,560, filed Sept. 12, 1963, and Ser. No. 408,702, filed Nov. 3, 1964. In such event, the by-products, having the relatively low contents of fatty substances, may be introduced into conveyor 48a by suitable means such as a hopper (not shown) and then delivered through chute 49 into the third stage mixer 50. The material then enters the fine grind mill R and is processed as heretofore described.

It is pointed out the processing of by-products of cereal grains from sources other than the milling machine E of Section I (FIG. 1) may proceed when the milling machine and its associated equipment, piping, etc., are not in use; or it may proceed simultaneously when the machine E is performing its primary milling function of an original grain supply.

SECTION III—EXTRACTION OF BRAN SOLIDS FROM MISCELLAS

Section I, heretofore described in detail, relates to the extractive milling and handling of the whole and larger broken grain solids to produce products. Section II relates to the separation of the various fractions of cereal grains in the presence of a solvent. The fine materials which are washed out in the conveyor F-1 (FIG. 1) and in the conveyor F-2 (FIG. 2) and also from the screens J (FIG. 1) and P (FIG. 2) are suspended in dilute miscellas which contain most of the residual fatty substances that accompanied the main stream of solids discharging through conduit 35 extending from section E-3 of the milling machine E. The oil-containing dilute miscellas from the several collecting points of FIGS. 1 and 2 all ultimately reach the weak miscella slurry tank K. Section III, shown in FIG. 3, illustrates a flow diagram which effectively separates the fine materials from the miscellas.

The main concentration of fatty substances from section E-2 of the milling machine is discharged through pipe 83 into hopper 84 which is located over a conveyor section F-3. The solids in conveyor section F-3, which comprise the husk, bran layer particles and small pieces of endosperm and germ removed from the grain in milling section E-2 are carried out of the solvent miscella level in conveyor section F-3 and discharged into first stage mixer tank 87. The partially settled strong miscella rises in hopper 84 and overflows into pipe 83a which delivers it to strong miscella settler H. Any excess of recycled strong miscella from pipe 9a also enters the settler through pipe 9d which joins pipe 83a, as illustrated in FIG. 3.

The sludge which settles as a dense sludge of 25 to 50 percent solids content in strong miscella settler H is withdrawn through a suitable valve 89, which is preferably equipped with a density control device, and enters sludge pump 90. The slurry is delivered through pipe 91 into conveyor section F-3 where the sludge solids are drained of much of their strong miscella and delivered to first stage mixing tank 87. Likewise delivered to mixing tank 87 are the weak miscella slurry from tank K by means of pump 92 and pipe 93, the separated sludge from wet cyclone X (also shown in FIGS. 1 and 4) by means of pipe 94, separated miscella through pipe 95 from the second stage slurry centrifuge Z (also shown in FIG. 4) and the settlings from the evaportor feed tank AA (also shown in FIG. 4) through pipe 96. All of these sources of strong miscella sludge which thus enter first stage mixing tank 87 provide the solids which have collectively been described herein as the bran solids, although there may be also a smaller content of broken endosperm and germ fractions. The miscellas accompanying these bran solids are all fractions of the strong miscella which originated from strong miscella settler H and milling section E-2, with the exception of the weak miscella from slurry tank K which provides the dilution solvent for the strong miscella slurry in mixer tank 87.

The diluted strong miscella slurry in mixer 87 is withdrawn by pump 97 and delivered in regulated feed through pipe 98 to a first stage centrifuge Y where the liquid is extracted and sent through pipe 99 to the downcomer in strong miscella settler H. The extracted bran solids are discharged through pipe 99a to the second stage mixer tank 100 where they are diluted with final wash solvent from pump 85 (also shown in FIG. 2) and/or fresh solvent from solvent pump 101 which are delivered through pipes 86b, 67, 67b and 67c. The slurry is mixed and is then sent to second stage bran centrifuge Z by means of pump 102 and pipe 103. The extracted liquid is conducted as a dilution miscella from centrifuge Z through pipes 95, 94 and end of conveyor F-3 to the first stage mixer 87. The washed solids are sent by means of chute 104 to the conveyor 48a, which is shown and has been described in connection with FIG. 2, where they are delivered to third stage mixer 50 of Section II; the solids will then proceed through the remainder of the Section II, as has been described, and will be recovered as end products.

The bran solids or fine materials separated in Section III, as above described, refer primarily to the materials obtained from section E-2 of the milling machine E. It will be evident that the mixer and centrifuge stages shown in Section III provide a process which separates the solids from the miscella and thereafter the solids are processed to separate their components in the multiple mixing, screening, centrifuging and desolventizing steps of Section II. So it may be said that the process of Section III, insofar as solids in the miscella is concerned, precedes the final separation and recovery operations of Section II.

Although the combined processes of Sections III and II have been found particularly useful for subsequent treatment of the by-products produced by the milling machine E, said combined processes are not limited to the particular cereal and sorghum grains heretofore identified as handled by the milling machine E. For example, unextracted rice bran from a conventional dry milling process, which contains 12 to 14 percent of fatty substance may be effectively processed by introduction into the first stage mixer 87 of Section III, preferably by means of a conveyor feeding into the hopper 84 of the conveyor F-3. In such case, it would be exposed to the extractive action of the solvent as it passed through Section III and subsequently through Section II, with the result that improved final products will be obtained. However, as previously noted, if the rice had been milled by a solvent extraction process so that it contains only 0.5 to 1.5 percent residual fat, it may be processed by introducing the material to the third stage mixer 50 of Section II. In the case of wheat shorts, which contain about 5 percent fats as derived from conventional wet milling, these may be processed by introducing the same either to hopper 84 of Section III or to the mixer 50 of Section II; in either case, the material is subjected to sufficient solvent extraction of the fatty substances to accomplish the improved results.

With respect to the cereal grains, such as corn, wheat, rye and the sorghum grains, which are subjected to the solvent extraction milling in milling machine E, these materials contain very little fat and are subsequently processed in Section II, as described. The purpose of Section III as to these grains is to separate the bran solids or fine materials from the miscellas.

SECTION IV.—RECOVERY OF CEREAL OIL AND SOLVENT

FIG. 4, which illustrates Section IV of the over-all process, relates to the solvent and oil recovery operations from the excess of clarified strong miscella from the wet cyclone or centrifuge X which is conducted to the recovery operations through pipe 9b; the cyclone X and pipe 9b are also shown in FIGS. 1 and 3. As previously explained, the proper amount of strong miscella is recycled in the milling machine and its auxiliaries, inclusive of the strong miscella settler H, to satisfy the requirements of this system. As oil is extracted in the primary extractive milling operation and also in the secondary extractions which follow, the various solvent washing and rinsing operations, preferably in countercurrent flow, require the introduction of fresh solvent into the final washing operations by means of the pump 101. Eventually, the oil content of this solvent builds up to the point where it becomes the medium miscella from the first stage centrifuge Y (shown in FIG. 3) and enters miscella settler H through pipe 99. This miscella then becomes a component of the strong miscella which is recycled from miscella settler H to milling machine E and return, and compensates for the oil yielded by extraction in maintaining the density of the strong miscella. The resulting volume increase activates the liquid level controller 9 which causes the bypassing of strong miscella from pipe 9a through control valve 9c into the miscella filters supply line 9b.

Miscella filters G (FIG. 4) are arranged in pairs or in several pairs in larger installations. The objective is to have one filter of each pair operating on the line while the second filter is being sluiced down and washed with solvent preparatory to returning it to service. The filtrate from filters G is delivered to the evaporator feed tank AA through pipe 104a and the sludge from the sluicing of filters G is returned through pipes 105 and 94 to the first stage mixing tank 87. The settlings from the evaporator feed tank AA also are returned in like manner through pipe 96 which connects to pipe 94.

The resettled strong miscella, now substantially free of the larger solid particles, overflows from evaporator feed tank AA through pipe 106 and enters pump 107 which pumps the miscella through pipe 108 and heater BB which discharges into the lower section of evaporator CC. This evaporator is shown as the preferred rising film type, but may be of any other suitable design. It is preferably fitted with a recirculation downcomer and a liquid level control. Steam for heating the miscella is also provided to the tube bundle to provide the necessary circulation effects within the vertical tubes of the evaporator.

The vapors from the evaporator CC are conducted through conductor 108a to evaporator condenser DD wherein the vapors are condensed. The condensed vapors are discharged through line 108b into the solvent separator EE where any water is allowed to coalesce and settle. The settled solvent overflows the weir 109 where it is withdrawn by pump 101 through pipe 110 and returned to the process through pipe 67.

The concentrated miscella which is discharged from evaporator CC through liquid level controller 111 and control valve 112 is fed through pipe 113 into the stripping column FF where the remaining solvent in the miscella is stripped out with live steam. The solvent vapors, steam and condensate are discharged from the oil stripper through pipe 114 and enter water stripper GG from which the water is discharged to a waste trap W and the vapors are carried through pipe 115 to the solvent condenser DD.

The stripped oil is removed from the soil stripper FF by means of pump 116, the rate of withdrawal being controlled by the level controller and control valve assembly 117. The oil may be sent through line 118a to oil surge tank 118 which supplies pump 119, or else it may be bypassed in regulated flow through pipe 120 which supplies the bran-coat additive tank B (FIG. 1) which has been previously described.

If an additive intended for the bran-coat softening operation other than the cereal grain oil is used, or if the cereal grain oil is to be mixed with another additive or mixture thereof, these other additives are placed in additive pump tank C and are withdrawn by pump 121 and delivered through pipe 122 to pipe 120 which supplies additive tank B.

Pump 119 below surge tank 118 pumps the stripped cereal grain oil through a filter HH. The filtered oil is then conducted through line 119a to a grain oil storage tank II from which it may be withdrawn by pump 123 and discharged through pipe 124 to tank cars or tank trucks for delivery to other locations for use in the crude state, or is refined in the usual manner.

In FIG. 4, JJ and KK are desolventizer condensers which condense vapors from desolventizer systems L (FIG. 1) Q and W (FIG. 2) which have been previously described; LL is the solvent storage tank which receives solvent supply through pipes 125 and 125a by means of pump 126. Pump 127 is used to transfer new solvent through pipes 128 and 128a to the settled solvent in solvent separator EE to compensate for solvent losses in process, which will average about one-half gallon per ton of processed grain.

Solvent vapor vent lines to the main solvent vapor header 129 (FIG. 1) are indicated at a number of points of most importance, but not all such locations are shown. The solvent vapor recovery system MM may be any of several conventional systems inclusive of the oil absorption, activated carbon and refrigerated condenser types which may be used singly or in combinations. The vapors in solvent vapor header 129 are first sent to vent condenser NN to effect as much condensation as possible, after which the uncondensed vapor and incondensable gases are conducted to the solvent vapor recovery system MM. The condensate from vent condenser NN is directed through lien 130 to the solvent separator EE in common with all of the several sources of solvent condensate.

It is apparent that the cereal oil is separated from the solvent in Section IV of the process and the solvent is suitably clarified for re-use in the system. The cereal oil is recovered and a portion thereof may be employed as the bran softening agent.

From the foregoing, it is seen that the invention provides a new and improved cereal grain milling and solvent extraction process which is particularly adapted in its several variations to cereal grains which have oil contents ranging between 1.5 and 5.5 percent by weight. Such materials, to the applicant's knowledge, have never been (a) subjected to solvent extraction, in toto, during the initial stage of the milling process preparatory to the final dry milling and separations processes such as in the manufacture of cracked or milled whole grains, meal or flour; (b) similarly treated as above described followed by several stages of grinding, extraction and separations in the perparation of starch and animal feeds while in a solvent medium instead of water; and (c) where oil extraction occur simultaneously with milling instead of from a separated germ fraction. The primary solvent extractive milling process of Section I is applicable to the identified cereal grains, namely maize or corn, wheat, rye and the sorghum grains to produce oil-extracted products. The separation processes of Sections II and III are applicable not only to the particular cereal grains milled in the milling machine E of Section I but may be used in treating the by-products produced from other miling processes or the by-products of other cereal grains, such as rice bran.

While the process herein disclosed may be suitable for the extraction of essential oils from other products of vegetable origin, it is definitely unsuitable for the extraction of vegetable oils from oil-rich seeds such as cottonseed, soyabean, flaxseed, etc. in which process oil-rich miscellas are produced in quantity for evaporation and stripping, and where larger quantities of miscella must go directly to the oil recovery operations instead of being extensively recycled to the primary extraction operation. In such process it is customary to initially prepare the oil-rich seeds by cooking and flaking prior to extraction to reduce problems caused by fine solids in large volumes of the miscella. The improved process of thin invention, therefore, clearly distinguishes from the prior art and has been developed to meet requirements which do not exist in either the conventional dry or wet milling of cereals, and in the solvent extraction of the oil-seeds of commerce. It has been developed to be especially applicable to new cereal grain milling practices and a controlling reason for its success is the novel first stage simultaneous milling and oil extraction step which initially effects a substantial separation between the bran coat, endosperm and much of the fatty constituents wherein the miscella performs its function repetitively in a number of cycles. Due to the initially low oil content of the cereal grains, an excess of the strong miscella accumulates slowly. This fact reduces the amount of miscella which must be prepared for evaporation, and the miscella fines problem becomes substantially nil due to the small amount of miscella which must be clarified and/or filtered for use as evaporator feed in the solvent and oil recovery operations. As a consequence thereof, the equipment requirements of these liquid recovery operations are small and relatively inexpensive.

While certain types of apparatus are shown on the drawings and described herein, it should be understood that functionally equivalent apparatus may be substituted. For instance, a horizontal extractive milling machine is described. Instead, a vertical extractive milling machine plus a means for separating the larger endosperm fractions from the more finely comminuted bran, germ and smaller endosperm particles, is a functional equivalent. Likewise, closed solvent and vapor proof drag or other conveyor types may be substituted for the screw flight conveyors illustrated. Centrifuges may be substituted for gravity settlers, or vice versa; and filters may be used in lieu of either because of the readiness with which the substantially nonhydrated grain solids will separate from the miscella in which they appear. Various other functional equivalents of illustrated or described apparatus will be obvious to those skilled in the process arts.

Although only one apparatus of a kind may have been shown in the drawings and described herein, it will be understood that the number required will be determined by the scope of the operation, and may be arranged for parallel or series operations. Thus, where a single mill is shown, there may be intermediate separations of the ground materials with return of oversized material to another milling stage. Such methods are well known to those in both the dry milling and wet milling arts, and to show all such details would add unnecessarily to the length and complexity of the descriptions and drawings.

The term "milling" as used hereinabove and in the appended claims is a generic descriptive term which is intended to be inclusive of any means for the softening, dissolution and mechanical removal of the germ and bran coat from cereal grains in the primary extractive stage of the process. Subsequent comminution of the milled kernels is referred to as grinding, fine grinding and pulverizing. Such terms exclude the initial or primary milling step. The said "milling step" is characterized in all operations where there is concomitant extraction of fatty materials by either the presence of a substantially nonaqueous extractive solvent, or instead a solvent azeotrope or constant boiling mixture which contains some water.

The term "bran coat" as used hereinabove and in the appended claims is intended to be descriptive of the components of the outer pericarp or analogous glutenous, fibrous and proteinaceous substances, or combinations of these, in an outer coat or enveloping structure for the starchy endosperm.

The descriptive terms for the miscellas, i.e., strong and medium are synonymous with the terms full and half miscellas, respectively, when used herein.

It is believed that the above descriptions of the several embodiments of the methods, materials, proportions and apparatus of the present invention are sufficient that it is apparent that the same may be widely used without central departure therefrom; also that all such modifications and departures are contemplated as falling within the scope of the appended claims.

From the foregoing it will be seen that this invention is one well adapted to attain all of the ends and objects hereinabove set forth, together with other advantages, which are obvious and which are inherent in the process.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What I claim is:

1. An improved process for milling cereal grains selected from the group consisting of wheat, maize, rye and the sorghum grains, comprising:
   intimately mixing the unmilled cereal grain kernels with a liquid bran-coat softening agent used in sufficient proportion to effect a softening of the bran coat,
   subjecting the kernels to a milling step in the presence of the liquid bran-coat softening agent and a substantially nonaqueous volatile liquid organic solvent to effect a substantial separation of the bran layer constitutents from the predominantly starchy endosperm components,
   controlling the degree of milling in the milling step to also effect a partial distintegration of the kernels to effectively release and separate the germ fractions from the endosperm components,
   extracting the fatty components from the bran coat and endosperm components with a substantially nonaqueous volatile liquid organic solvent,
   separating the solvent containing the fatty components from the bran coat and endosperm components, and
   recovering the cereal oil from the solvent.

2. An improved process for milling cereal grains selected from the group consisting of wheat, maize, rye and the sorghum grains, comprising:
   intimately mixing cereal oil with the unmilled cereal grain in sufficient proportion to effect a softening of the bran coat,
   subjecting the kernels to a milling step in the presence of the cereal oil and a substantially nonaqueous volatile liquid organic solvent to effect a substantial separation of the bran layer constituents from the predominantly starchy endosperm components,
   controlling the degree of milling in the milling step to also effect a partial distintegration of the kernels to effectively release and separate the germ fractions from the endosperm components,
   extracting the fatty components from the bran coat and endosperm components with a substantially nonaqueous volatile liquid organic solvent,
   separating the solvent containing the fatty components from the bran coat and endosperm components,
   recovering the cereal oil from the solvent, and
   utilizing a portion of the recovered cereal oil in the initial step of mixing cereal oil with the unmilled grain.

3. The process of claim 2 wherein:
   the cereal oil mixed with the unmilled cereal grain is a recycled evaporated miscella from the oil recovery operations at a point which contains a substantial portion of residual solvent.

4. The process of claim 2 wherein:
   the cereal oil mixed with the unmilled cereal grain in the initial step is recycled in substantially the solvent-free state from the oil recovery operation.

5. An improved method for processing cereal grains selected from the group consisting of wheat, maize, rye and the sorghum grains, comprising:
   subjecting the kernels to a milling step in the presence of a substantially nonaqueous voltatile liquid organic solvent and a bran-coat softening agent to soften and remove the germ and the bran coat and to extract the fatty components,
   withdrawing the milled kernels and the separated bran from the milling step,
   grinding the milled kernels and the separated bran in the presence of a substantially nonaqueous volatile liquid organic solvent to further extract fatty components,
   separating and washing with solvent the coarser material consisting of endosperm, fibrous and proteinaceous fractions which is derived from the grinding step, separately collecting the washed predominantly starch endosperm fines resulting from the grinding, separating and washing steps, recovering bran solids from the miscella after they leave the milling step, processing said bran solids in the presence of a nonaqueous volatile liquid organic solvent to produce substantially fat-free bran solids, combining the coarser material consisting of endosperm, fibrous and proteinaceous fractions with the recovered solvent extracted, substantially fat-free bran solids, fine grinding and further extracting the combined coarser material and bran solids in the presence of a substantially nonaqueous volatile liquid organic solvent, separating the finely ground starchy fraction from the fibrous and proteinaceous fractions, separately desolventizing and recovering the starchy fractions and the combined fibrous and proteinaceous fractions, and recovering the cereal oil from the solvent.

6. An improved method for processing cereal grains selected from the group consisting of wheat, maize, rye and the sorghum grains, comprising:

subjecting the kernels to a milling step in the presence of a substantially nonaqueous volatile liquid organic solvent and a bran-coat softening agent to soften and remove the germ and the bran coat and to extract the fatty components, withdrawing the milled kernels and the separated bran from the milling step, further extracting the milled kernels and the separated bran in separate operations to render them substantially free of the fatty components, grinding the milled kernels in the presence of a substantially nonaqueous volatile liquid organic solvent, separating and washing with solvent the coarser materials consisting of endosperm fibrous and proteinaceous fractions, separately collecting the washed predominantly starch endosperm fines resulting from the grinding and separating steps, recovering bran solids from the miscella after they leave the milling step, combining the collected predominantly starch endosperm fines with said recovered bran solids, processing said bran solids and endosperm fines in the presence of a nonaqueous voltatile liquid organic solvent to produce substantially fat-free bran and endosperm solids, combining the coarser material derived from the first grinding and separating steps, with the recovered solvent extracted, substantially fat-free bran and endosperm solids, separating the fibrous and proteinaceous bran constituents from the starch solids, recovering the starch solids, desolventizing the said starch solids in a separate desolventizer system, separately recovering the desolventized starch and the combined desolventized fibrous and proteinaceous fractions, and recovering the cereal oil from the solvent.

7. An improved method for the processing of cereal grains selected from the group consisting of wheat, maize, rye and sorghum grains in the production of meal and flour, comprising:

milling the germ and the bran coat from the cleaned, raw kernels of the grain in the presence of a substantially nonaqueous volatile liquid organic solvent and a bran-coat softening agent, controlling the degree of milling to effect partial disintegration of the kernels to assure release and separation of the germ fractions from the endosperm components, extracting fatty components from the milled grain kernels and the bran, separating the bran solids from the milled grain kernels, subsequently and separately further extracting the said separated milled kernels and bran solids fractions until substantially fat free, separately desolventizing and grinding the milled kernels to a meal or flour, desolventizing and recovering the substantially fat-free bran solids fractions, and recovering the extracted cereal oil from the solvent.

8. An improved method for the processing of wheat in the production of bulgur, comprising:

milling the germ and the bran coat from parboiled wheat in the presence of a substantially nonaqueous volatile liquid organic solvent and a bran-coat softening agent, extracting fatty components from the milled wheat kernels and bran, separating the bran solids from the milled wheat kernels, separately extracting the said separated milled wheat kernels and bran components until substantially fat-free solids are recovered, separately desolventizing and recovering the said substantially fat-free milled wheat and bran solids, and recovering the wheat oil from the solvent.

9. An improved method for the processing of cereal grains selected from the group consisting of wheat, maize, rye and the sorghum grains in the production of starch and gluten comprising:

milling the germ and bran coat from the cleaned, raw kernels of the grain in the presence of a substantially nonaqueous volatile liquid organic solvent and a bran-coat softening agent, extracting fatty components from the milled grain kernels and the bran, separating the bran solids from the milled grain kernels, wet grinding the milled grain kernels in the presence of an extractive solvent for fatty constituents, separating the coarser fibrous and proteinaceous fractions from the finer starch particles, recovering the starchy suspension and combining it with bran solids, wet grinding the combined starch and bran solids to a fine dispersion in the presence of a substantially nonaqueous volatile liquid organic solvent, separating the fibrous and proteinaceous fractions from the starch, combining the fibrous and proteinaceous fractions with the coarser fibrous and proteinaceous material derived from the first grinding step, desolventizing and recovering the combined fibrous and proteinaceous material, recovering the starch fraction from the suspension, desolventizing and recovering the starch, and recovering the cereal oil from the solvent.

10. The method of claim 5 wherein:
the fibrous fraction and the proteinaceous fraction in the bran solids are separately collected and desolventized.

11. The method of claim 9 wherein:
the fibrous fraction and the proteinaceous fraction are separately collected and desolventized.

12. The method of claim 7 wherein:
there is introduced into the unseparated slurry comprising the fibrous, proteinaceous and starchy components dispersed in a substantially nonaqueous volatile liquid organic solvent an amount of water sufficient to be absorbed by the fibrous and proteinaceous fractions and insufficient to leave a substantial amount of free, unabsorbed water in the said slurry.

13. The method of claim 9 wherein:

there is introduced into the unseparated slurry comprising the fibrous, proteinaceous and starch components dispersed in a substantilly nonaqueous volatile liquid organic solvent an amount of water sufficient to be absorbed by the fibrous and proteinaceous fractions and insufficient to leave a substantial amount of free, unabsorbed water in the said slurry.

14. The method of claim 13 wherein:

the proportion of water to be added to the slurry of fibrous, proteinaceous and starchy components of a cereal grain is selected from the range comprising from 20 to 200 percent of the combined weights of the fibrous and proteinaceous fractions in the said slurry.

15. The method of claim 12 wherein:

the proportion of water to be added to the slurry of fibrous, proteinaceous and starchy components of a cereal grain is selected from the range comprising from 20 to 200 percent of the combined weights of the fibrous and proteinaceous fractions in the said slurry.

16. A process for effecting a substantial separation of the components of brans which have been separated from kernels by the milling of the cereal and sorghum grains, comprising:

treating said bran components with a volatile liquid organic solvent to extract the fatty substances, mechanically separating to a substantial degree the fibrous, proteinaceous and starchy components of the bran in the presence of a volatile liquid organic solvent, separately recovering and desolventizing the fibrous, proteinaceous and starchy components of said bran, and recovering the extracted cerael oil from the solvent.

17. A process for effecting a substantial separation of the fibrous, proteinaceous, starchy and fatty components of the brans which have been separated from kernels by the milling of the cereal and sorghum grains, comprising:

treating said bran components with a volatile liquid organic solvent to extract the fatty substances, grinding the resulting slurry in the presence of a minor proportion of water to produce finely ground solids particles within the said slurry wherein the fibrous and proteinaceous solids preferentially absorb most of the added water, separating to a substantial degree the fibrous proteinaceous and starchy components of the bran slurry in the presence of a volatile liquid organic solvent, desolventizing the said separate fibrous, proteinaceous and starchy components, and recovering the extracted cereal oil from the solvent.

18. The process for effecting a substantial separation of the fibrous, proteinaceous, starchy and fatty components of the brans derived from the milling of cereal and sorghum grains, comprising:

treating said cereal bran components with moisture at a temperature below the gelatinizing point of the starchy component to promote preferential moisture absorption by the fibrous and proteinaceous components thereby decreasing the specific gravity of the said components relative to that of the starchy fraction.

maintaining the said cereal bran components in a slurry while treating the said bran with a volatile liquid organic solvent to extract the fatty substances, grinding the resulting slurry in a wet milling device to produce a finely ground slurry, subjecting the finely ground slurry to multistage separations steps to effect substantial separations of the fibrous, proteinaceous and starchy components of the bran in the presence of a volatile liquid organic solvent, separately recovering and desolventizing the said bran components, and recovering the extracted cereal oil from the solvent.

19. A process for effecting a substantial separation of the fibrous, proteinaceous and starchy components of brans derived from the milling of cereal and sorghum grains, comprising;

increasing the moisture content of the said bran components to effect preferential absorption thereof by the fibrous and proteinaceous components thereby decreasing their respective specific gravities relative to the starchy component thereof, maintaining the said moistened bran components in a slurry with a volatile liquid organic solvent, grinding the said slurry in a milling device to produce a fine dispersion in which the fibrous particles are larger than the proteinaceous and starchy components, removing the larger fibrous components by multistage screening, centrifuging the effluent slurry to separate the proteinaceous and starchy components as overflow and underflow fractional slurries in accordance with the respective specific gravities of the said components, recovering the separated fibrous component from the screens, recovering the proteinaceous and starchy component solids from their respective fractional slurries, separately desolventizing and recovering the fibrous, proteinaceous and starchy component solids, and recovering the extracted cereal oil from the solvent.

20. A process for effecting a substantial separation of brans derived from the milling of the cereal and sorghum grains into the fibrous, proteinaceous and starchy components, comprising:

treating said bran components with a volatile liquid organic solvent to extract fatty substances, grinding the resulting slurry in a wet milling device to produce a finely ground slurry, subjecting the said slurry to multistage screening to remove most of the fibrous component, recovering the screened effluent and directing it to the first stage of a multistage centrifuging operation to separate most of the proteinaceous and residual fibrous components from the said effluent, subjecting the underflow slurry from the first stage centrifuging to a second stage centrifuging to separate the starchy component from the residual proteinaceous component, returning the residual proteinaceous component to a point preceding the first stage centrifugal step, separately recovering the predominantly proteinaceous solids and the starchy solids from their respective centrifuge effluents, separately desolventizing, and recovering the substantially solvent-free proteinaceous and starchy components, and recovering the extracted cereal oil from the solvent.

21. The process of claim 20 together with the additional step of:

introducing into the unseparated slurry comprising the fibrous, proteinaceous and starch components dispersed in a volatile liquid organic solvent an amount of water sufficient to be absorbed by the fibrous and proteinaceous fractions and insufficient to leave a substantial amount of free, unabsorbed water in the said slurry.

22. The process of claim 20 wherein the added moisture content of the cereal bran is not less than 20 percent of the combined weights of the fibrous and protenaceous components of the said bran when entering the fine grinding step.

23. The process of claim 20 wherein:
the added moisture content of the cereal bran is within the range of 20 to 200 percent of the combined weights of the fibrous and proteinaceous components of the said bran when entering the fine grinding step.

24. The process of claim 20 wherein:
the fibrous material derived from the multistage screening operation is combined with proteinaceous and residual fiber solids from the top flow slurry derived from the first stage centrifuging operating prior to the desolventizing operation.

References Cited
UNITED STATES PATENTS

| 2,232,697 | 2/1941 | Earle. | |
| 2,460,389 | 2/1949 | Lloyd et al. | 99—80 |
| 2,530,272 | 11/1950 | Thrasher | 99—80 XR |
| 2,571,143 | 10/1951 | Leslie. | |
| 3,165,134 | 1/1965 | Wayne | 99—80 XR |
| 3,261,690 | 7/1966 | Wayne | 99—80 |

RAYMOND N. JONES, Primary Examiner

U.S. Cl. X.R.

241—6, 10